United States Patent
Morikawa et al.

(10) Patent No.: US 6,794,065 B1
(45) Date of Patent: Sep. 21, 2004

(54) PHOTOCATALYTIC MATERIAL AND PHOTOCATALYTIC ARTICLE

(75) Inventors: Takeshi Morikawa, Aichi-ken (JP); Ryoji Asahi, Aichi-ken (JP); Takeshi Ohwaki, Aichi-ken (JP); Yasunori Taga, Aichi-ken (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 291 days.

(21) Appl. No.: 10/048,933

(22) PCT Filed: Aug. 4, 2000

(86) PCT No.: PCT/JP00/05248
§ 371 (c)(1),
(2), (4) Date: Feb. 5, 2002

(87) PCT Pub. No.: WO01/10553
PCT Pub. Date: Feb. 15, 2001

(30) Foreign Application Priority Data

Aug. 5, 1999 (JP) .......................................... 11/223003
Jan. 27, 2000 (JP) ...................................... 2000/019315

(51) Int. Cl.[7] .............................. B01J 31/00; B01J 35/02
(52) U.S. Cl. ........................ 428/699; 423/265; 423/266; 423/610; 428/701; 428/702; 428/704; 502/350
(58) Field of Search ................................ 423/265, 266, 423/610; 502/349, 350, 326, 200, 216, 222; 428/699, 701, 702, 704, 690

(56) References Cited

U.S. PATENT DOCUMENTS

| | | | |
|---|---|---|---|
| 4,684,537 A | | 8/1987 | Graetzel et al. |
| 5,776,239 A | * | 7/1998 | Bruno ........................ 106/437 |
| 6,074,981 A | * | 6/2000 | Tada et al. .................. 502/224 |
| 6,306,343 B1 | * | 10/2001 | Sugiyama ...................... 422/4 |
| 6,355,308 B1 | * | 3/2002 | Sato et al. ............... 427/419.8 |

FOREIGN PATENT DOCUMENTS

| | | |
|---|---|---|
| EP | 818239 | 1/1998 |
| EP | 997191 | 5/2000 |
| JP | 61-042333 | 2/1986 |
| JP | 8-134630 | 5/1996 |
| JP | 9-75748 | 3/1997 |
| JP | 10-152396 | 6/1998 |
| JP | 11-180736 | 7/1999 |
| JP | 11-267519 | 10/1999 |
| JP | 11-333304 | 12/1999 |
| JP | 2000-070709 | 3/2000 |
| JP | 2000-103621 | 4/2000 |
| JP | 2000-140636 | 5/2000 |
| JP | 2000-143241 | 5/2000 |
| JP | 2001-347162 | 12/2001 |
| JP | 2001-354422 | 12/2001 |

OTHER PUBLICATIONS

S. Sato, Chemical Physics Letters, vol. 123, No. 1,2, pp. 126–128, "Photocatalytic Activity of No–Doped TiO: in the Visible Light Region", Jan. 3, 1986.

H. Noda, et al., Chemical Society of Japan Report, No. 8, pp. 1084–1090, "Method for Preparing Titanium Oxide(IV) and Its Characterization", 1985 No month.

Written Reply dated Apr. 25, 2003, pp. 1–31, (with English translation).

(List continued on next page.)

*Primary Examiner*—Ngoc-Yen Nguyen
(74) *Attorney, Agent, or Firm*—Oblon, Spivak, McClelland, Maier & Neustadt, P.C.

(57) ABSTRACT

A photocatalytic material having titanium oxide crystals and anions X incorporated therein, which is prepared by at least one of a method comprising substituting anions X for some of the oxygen sites of titanium oxide crystals, a method comprising doping anions X between lattices of a titanium crystal and a method comprising doping grain boundaries of titanium oxide, or a combination of these method. The photocatalytic material has acquired a new energy level formed in a band gap of titanium oxide, which results in its exhibition of a photocatalytic activity by absorbing visible lights. The photocatalytic material can thus exhibit a satisfactory photocatalytic activity under sunlight and also in a room with a fluorescent lamp.

19 Claims, 6 Drawing Sheets

OTHER PUBLICATIONS

U.S. patent application Ser. No. 10/062,413, filed Feb. 5, 2002.
U.S. patent application Ser. No. 10/048,933, filed Feb. 5, 2002.
U.S. patent application Ser. No. 10/048,933, Morikawa et al., filed Feb. 5, 2002.
U.S. patent application Ser. No. 10/181,918, Morikawa et al., filed Jul. 26, 2002.

* cited by examiner

PHOTOCATALYTIC MATERIAL AND PHOTOCATALYTIC ARTICLE

TECHNICAL FIELD

The present invention relates to a photocatalytic material and a photocatalytic article employing a $TiO_2$ crystal system.

BACKGROUND ART

Hitherto, known materials exhibiting a photocatalytic action include the likes of $TiO_2$ (titanium dioxide), CdS (cadmium sulfide), $WO_3$ (tungsten trioxide), and ZnO (zinc oxide). These photocatalytic materials are semiconductors, absorb light to form electrons and holes, and present various chemical reactions and bactericidal actions. However, because titanium oxide is nontoxic and is superior from the standpoint of stability to water and acid, so far only titanium oxide has been put to practical commercial use as a photocatalyst.

However, because of the values of the band gap (Eg=3.2eV) of titanium oxide, the operating light of such a titanium oxide photocatalyst is limited to ultraviolet light with a wavelength $\lambda<380$ nm. As a consequence, there remains an unfulfilled demand for development of materials which exhibit catalytic activity when irradiated with visible light with a wavelength of 380 nm or longer. These materials are desired, for example, for use indoors and for improving photocatalytic activity.

As described in Japanese Patent Laid-Open publication No. Hei 9-262482, by modifying materials using ion implanting of metal elements such as Cr (chrome) and V (vanadium) in anatase type titanium oxide having a high catalytic activity, the light absorbing edge of titanium oxide can be shifted to the long wavelength side to permit the operation of titanium oxide catalyst in visible light. No reports discussing the doping of Cr, V, and so on have been published since the early 1970s which succeeded in operating under visible light. Japanese Patent Laid-Open publication No. Hei 9-262482 describes that operation under visible light can be enabled through use of special techniques for doping Cr, V, and so on.

Thus, in the above conventional example, the operation of $TiO_2$ photocatalyst under visible light is made possible by a technique of ion implanting metal elements in $TiO_2$. However, metal ion implantation is disadvantageous because of its high cost. While there is a demand for methods for manufacturing $TiO_2$ photocatalyst, such as by synthesis in solution or by sputtering, when these methods are employed, the resulting photocatalysts can not be operated under visible light. It is generally considered that this is because Cr of the dopant aggregates or forms oxides such as $Cr_2O_3$ in a crystallization process. Thus, in the conventional examples, there is a problem that a technique of ion implanting metal elements must be adopted in order for metal elements to be used to enable operation of $TiO_2$ under visible light.

DISCLOSURE OF THE INVENTION

It is an object of the present invention to provide a photocatalyst which can operate under visible light by using novel materials and without using expensive techniques such as ion implantation.

In view of the above situation, the present inventors realized the present invention after conducting theoretical study of state density and optical physical properties using the first principle calculation as well as experimental study of photocatalysts reacting to light in a wavelength region extending from ultraviolet through visible light.

That is, the photocatalytic material according to the present invention comprises titanium compound Ti—O—X obtained by at least one of substituting an anion X at a plurality of oxygen site of titanium oxide crystals, doping an anion X between lattices of a titanium oxide crystal, and doping an anion X in grain boundaries of polycrystalline aggregate of titanium oxide crystal.

As a product of the above, a photocatalyst which exhibits photocatalytic activity after absorbing visible light can be obtained. Thus, the photocatalyst can exhibit satisfactory photocatalytic activity even under solar or fluorescent light.

Moreover, it is preferable in the Ti—O—X of the present invention that the anions be an element or molecule containing at least one of B, C, P, S, Cl, As, Se, Br, Sb, Te, and I. With these anions X, a new energy band is formed within the band gap of titanium oxide, permitting absorption of visible light.

Still further, it is preferable in the Ti—O—X of the present invention, that there be a chemical bond between titanium Ti and anions X. This results in charge-transfer between Ti and X and formation of an energy band, permitting efficient absorption of visible light.

Furthermore, it is preferable that $TiO_2$ crystals are formed on the external surface side of Ti—O—X of the present invention. With such a configuration, internal photocatalytic materials are able to absorb visible light to produce electrons and holes, with a result that photocatalytic action is exhibited by the $TiO_2$ crystals at the surface. The resulting photocatalyst can use visible light as operating light with maintaining functionality similar to conventional $TiO_2$ photocatalysts. For example, this constitution is very advantageous for decreasing the contact angle of water to realize a hydrophilic property.

Moreover, it is suitable that the Ti—O—X of the present invention be mainly oriented along the C axis direction at its surface. This constitution permits efficient light absorption at the surface because of anisotropy of optical absorption characteristics of photocatalytic materials.

In addition, as the crystalline phase of Ti—O—X to realize these characteristics, any combination of single crystals, polycrystals, or amorphous Ti—O—X may be used. However, single crystals and polycrystals tend to exhibit a greater photocatalytic activity than does amorphous Ti—O—X.

Further, in the Ti—O—X photocatalyst of the present invention, any crystal form of anatase, rutile, and brookite may be employed as the basic crystal.

BRIEF DESCRIPTION DRAWINGS

Figure 4:
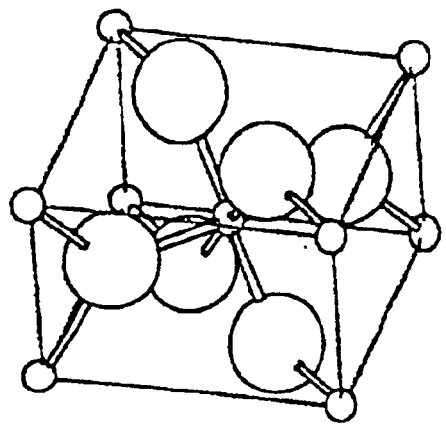
Figure 4:
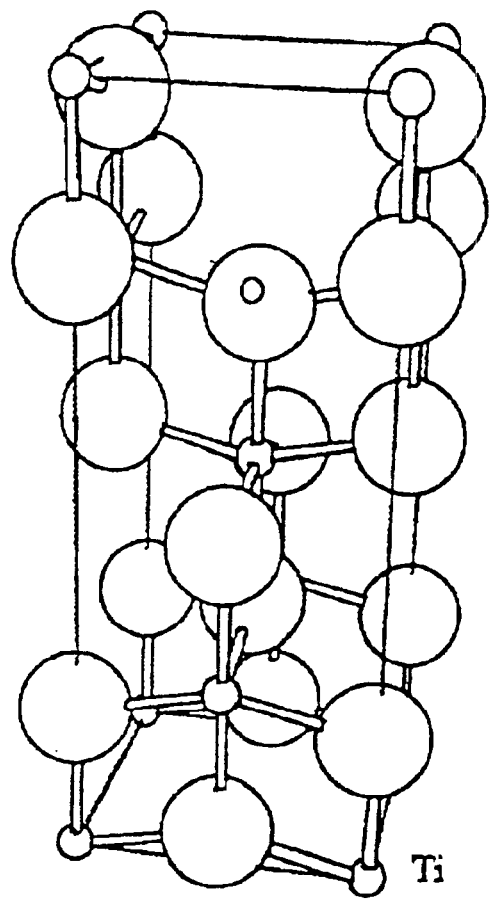

FIGS. 4(a) and 4(b) are views showing the crystalline phase of titanium oxide.

Figure 5:
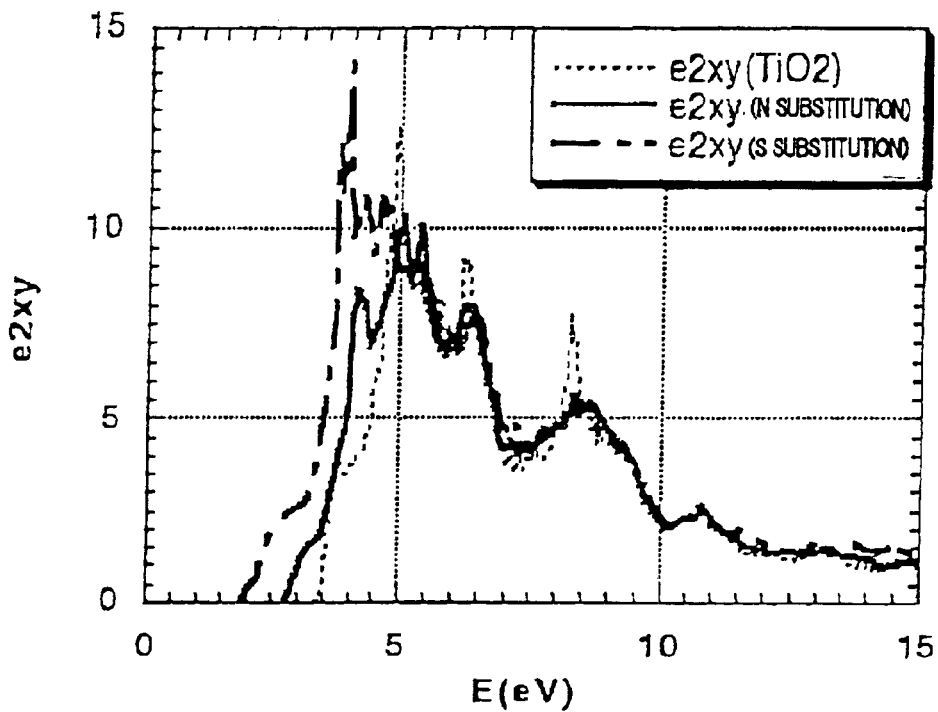
Figure 5:
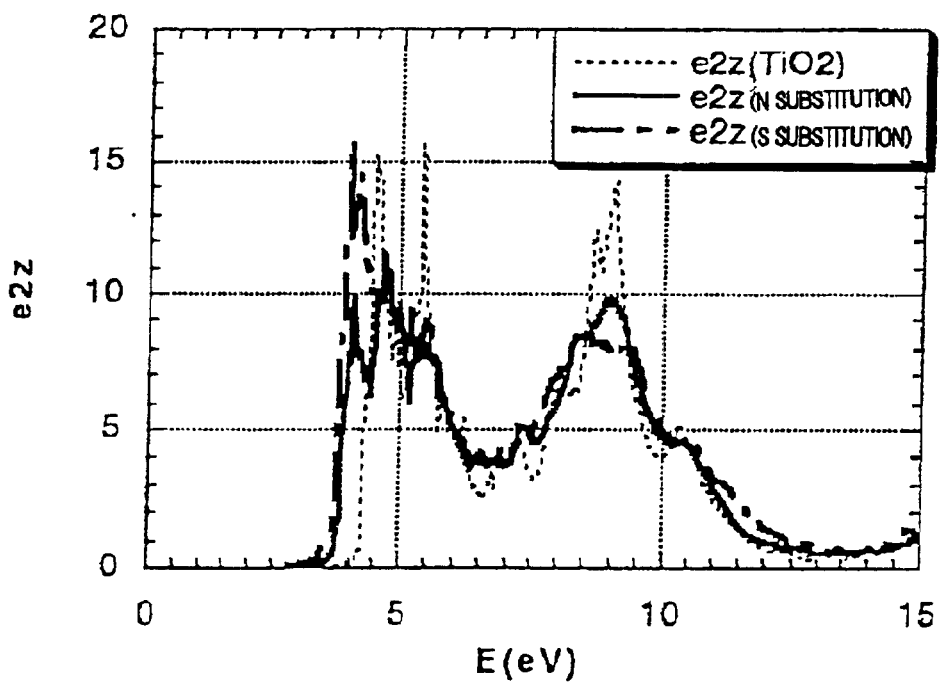

FIGS. 5(a) and 5(b) are views showing the energy dependency of the imaginary part of a dielectric constant function.

Figure 6:
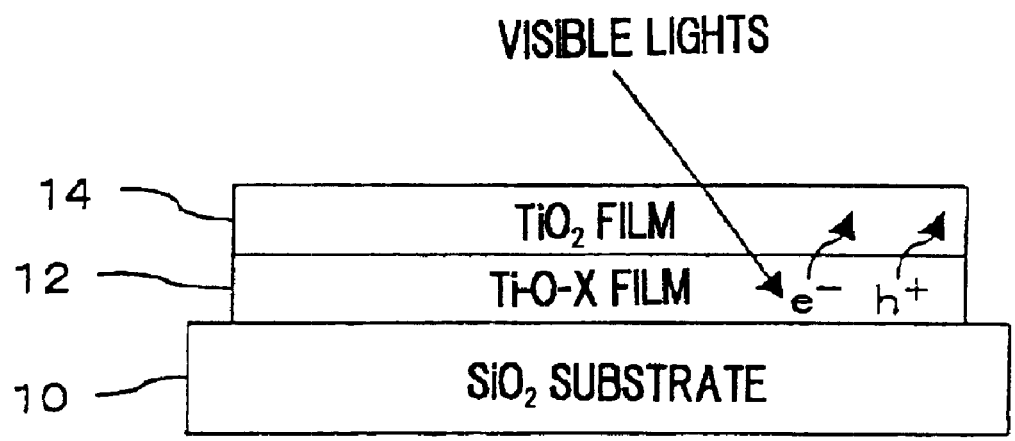
Figure 6:
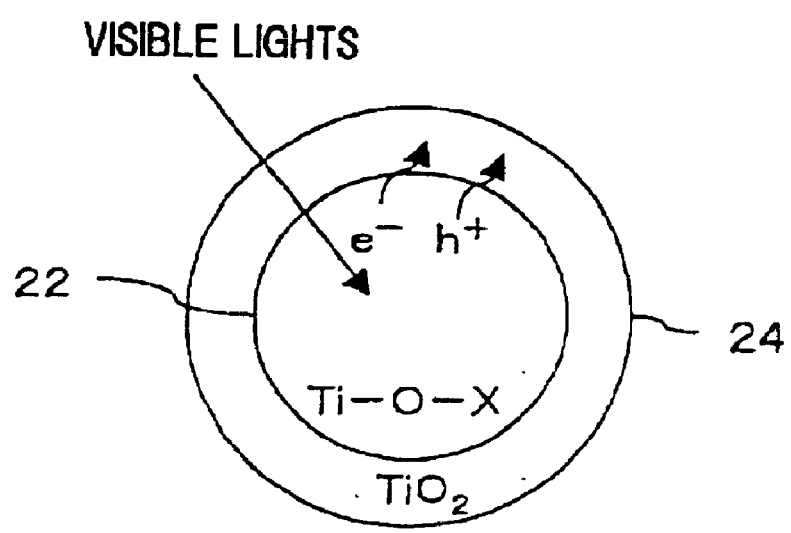

FIGS. 6(a) and 6(b) are views showing an Embodiment 3 of gradient composition.

BEST MODE FOR CARRYING OUT THE INVENTION

Embodiment 1

From a theoretical study of electronic state, density of state, and optical characteristics using the first principle calculation, the present inventors realized that the titanium oxide semiconductor containing anions X of the present invention forms a new level (energy band) contributing to absorption of visible light in the band gap of titanium oxide.

More specifically, electronic state and optical characteristics were evaluated using $TiO_{1.75}X_{0.25}$ unit cell substituting anions X for some of the oxygen sites of anatase titanium oxide by FLAPW (full-potential linearized-augumented-plane-wave) process, which is a principle calculation method.

Figure 1:
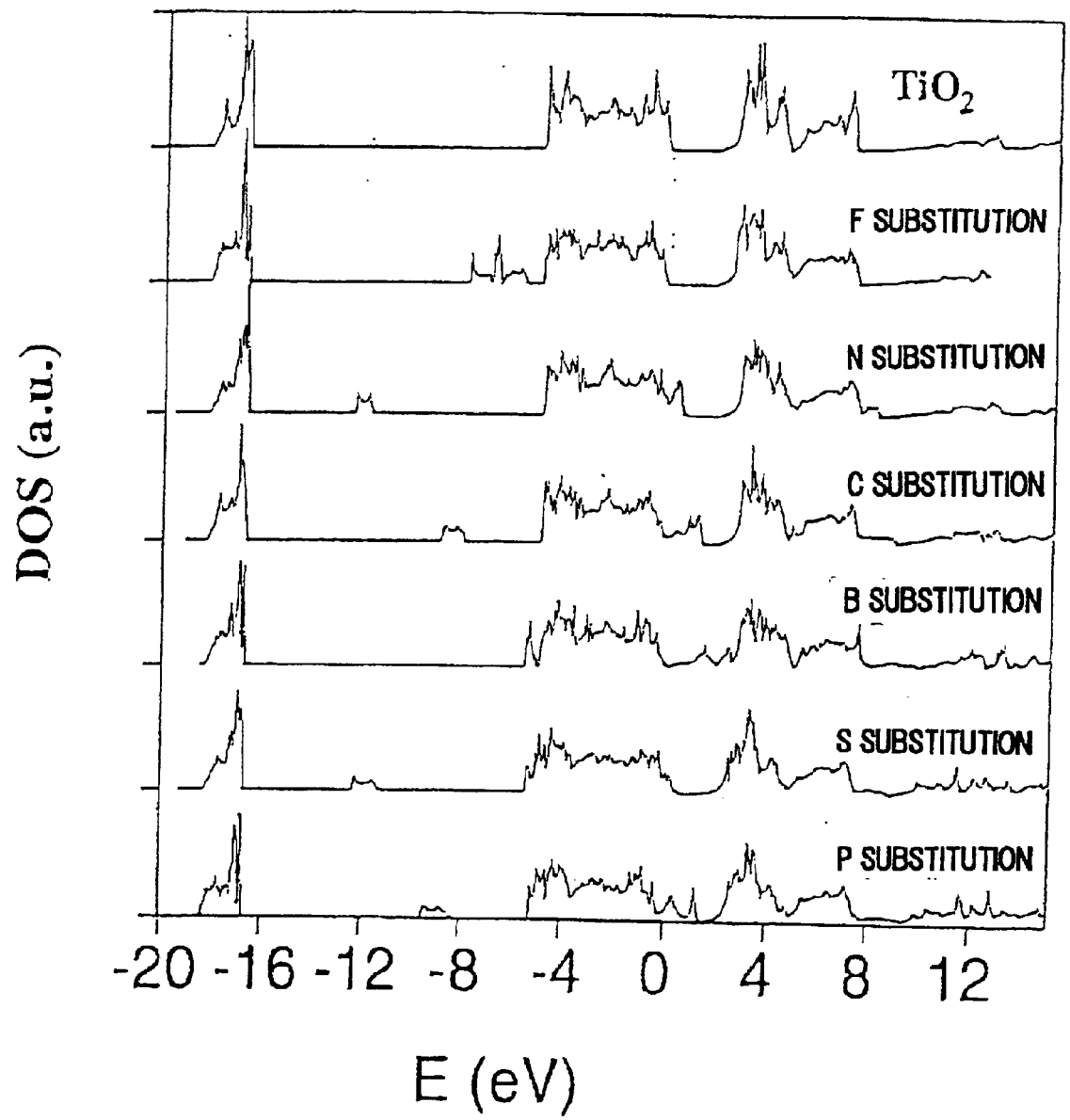
FIG. 1 is a view showing the state density of Ti—O—X.

FIG. 1 shows density of state (DOS) values calculated for semiconductor Ti—O—X. In this example, F, N, C, B, S, and P were adopted as anions X and the calculation results for these materials are shown.

Thus, it was found that the position at which the impurity level is formed varies with substitution species and correlates with the ionicity of these substitution species. Here, a valence band that rises on the minus side from energy 0 eV in each density of state in this FIG. 1, a conduction band of titanium oxide rises up on the plus side from the vicinity of 2.5 eV, and the interval between them corresponds to a band gap. Because the reduction level of water is in the vicinity of the conduction band of titanium oxide, it is desirable to design a narrow band gap by raising the valence band towards the conduction band of titanium oxide by forming the new impurity level at around the valence band, rather than the around conduction band, of titanium oxide.

Hence, it is found that nitrogen N and sulfur S are desirable as anions X from the standpoint of smooth hybridization of impurity levels and the titanium oxide band. However, in addition, it is found that visible light operation is possible also for boron B, carbon C, and phosphorus P because absorption takes place in the visible light region.

Further, the results of these density of state studies confirmed that approximately similar results are obtained in a unit cell containing anions X at lower concentration such as $TiO_{1.88}X_{0.12}$ and so on.

Figure 2:
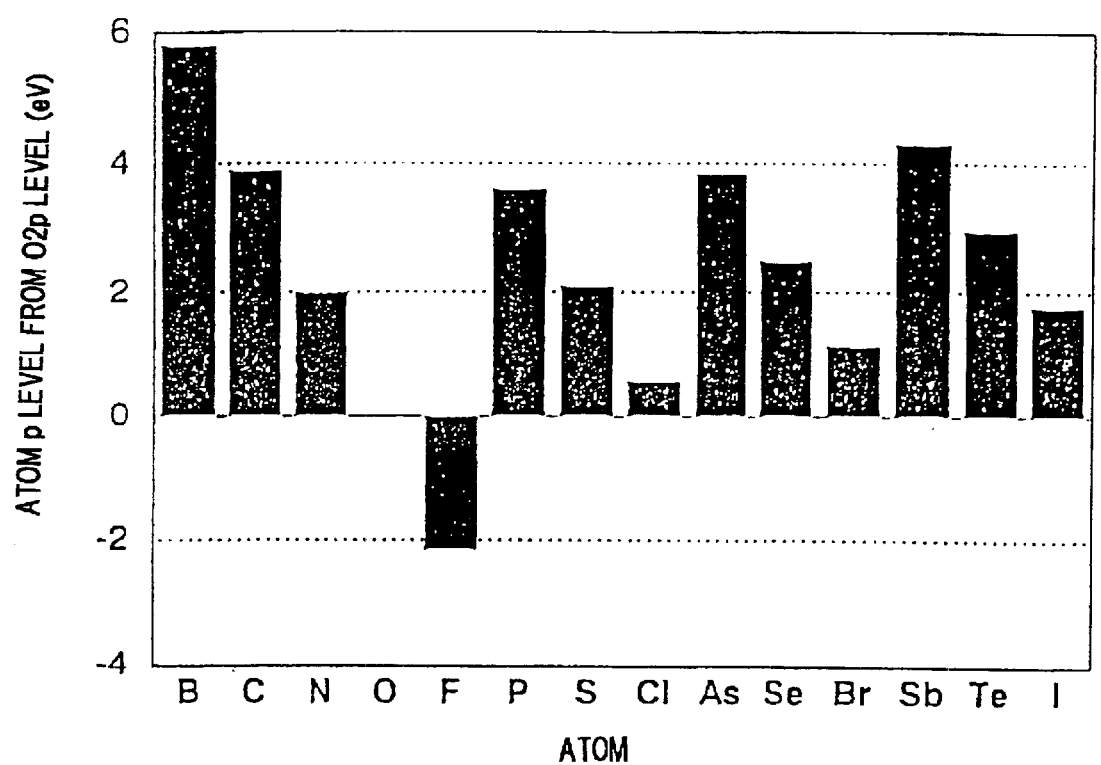
FIG. 2 is a view showing the level of the p state of various atoms measured from the level of the 2p state of O atom obtained by using FLAPW process.

The variation of the electronic state of titanium oxide due to substitution of these anions X is mainly attributed to the difference of atomic levels between O and anions X for titanium atom. FIG. 2 shows the levels of the p state of various atoms measured from the levels of the 2p state of O atom obtained using the same FLAPW process. A comparison with the results shown in FIG. 2, considering that the valence band of titanium oxide is mainly formed by the O 2p state in the density of state of FIG. 1, reveals that the impurity levels for the band of titanium oxide are qualitatively consistent with the atomic level of the p state. That is, in both cases the order of B→C→N→(valence band)→F is maintained and the levels of C and P and those of N and S appear near the same respective positions.

Then, also for Cl, As, Se, Br, Sb, Te, and I, the levels are present at nearer positions. Therefore, it can be seen from the results shown in FIG. 2 that visible light operation is possible because absorption in the visible light region similarly occurs also for Cl, As, Se, Br, Sb, Te, and I as anions X.

As described above, it is important that a Ti—X bond for charge-transfer is present between Ti and X in order that the position of the atomic level of anions X for titanium atom is reflected in an impurity level. Then, the anions X may be those substituting oxygen as well as those in which anions X are present in crystal lattices in an interstitial site or crystalline boundaries, or a combination of these. Moreover, anion containing effects of the present invention can be obtained when anions X are single elements such as B, C, P, S, Cl, As, Se, Br, Sb, Te, and I, or a combination of these elements, or in a molecular state containing oxygen and hydrogen.

Furthermore, although in the above example anion containing effects were calculated for the crystal lattice of anatase type titanium, similar effects can be obtained with rutile, brookite, and amorphous titanium oxides containing anions.

Figure 3:
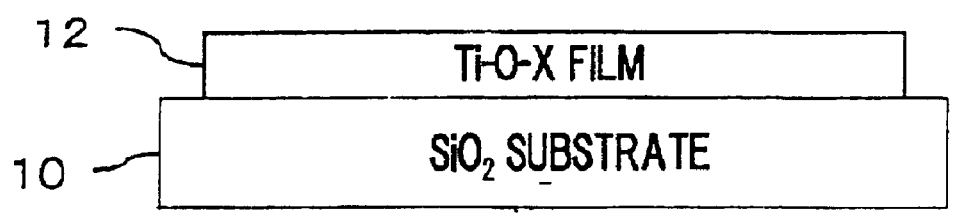
FIG. 3 shows the constitution of an Embodiment 1.

Here, FIG. 3 is a view showing the constitution of an Embodiment 1 in which Ti—O—X film 12 of a photocatalytic material is formed on a $SiO_2$ substrate 10. This Ti—O—X film 12 is prepared by at least one of a method comprising substituting anions X for some of the oxygen sites of titanium oxide crystals, doping anions X in an interstitial site of titanium oxide crystal, doping anions X in grain boundaries of polycrystalline aggregate of titanium oxide crystal, or a combination of these methods.

FIG. 4(a) shows rutile type titanium oxide crystals and FIG. 4(b) shows the crystalline unit lattices of anatase type titanium oxide. In these figures, small and large ○ show Ti and O, respectively. Ti—O—X is formed by substitution of X for a part of this O or by doping anion X in the interstitial site within crystals or grain boundaries of titanium oxide crystals.

An example manufacturing process for producing such a photocatalytic material will be described. In this example, Ti—O—X film 12 is manufactured by RF magnetron sputtering.

$SiO_2$ substrate 10 and titanium oxide target (or Ti—X, target for example Ti—S) are set in the vacuum chamber of a RF magnetronsputtering device. Then, an appropriate amount of gas containing anions X (for example, $SO_2+O_2$), gas, and an inert gas (for example Ar gas) are introduced into the vacuum chamber to conduct sputtering. Ti—O—X film 12 is accumulated on $SiO_2$ substrate 10. Moreover, as the substrate 10, various materials such as ceramic can be utilized.

Further, after deposition of Ti—O—X film 12 by sputtering, heat treatment (annealing) is performed for crystallization. Although simple film deposition yields an amorphous structure containing polycrystals, it is possible by heat treatment to attempt poly- and single-crystallization and further to form chemical bonds between titanium and anions X. Moreover, heat treatment after depositing film may also be omitted by forming Ti—O—X film 12 with heating the $SiO_2$ substrate 10.

Furthermore, although in the above example, Ti—O—X as a photocatalytic material in the form of a thin film was described, Ti—O—X can be applied not only in a thin film but can also be included in binder materials for painting such as silica, alumina, fluororesin (polytetrafluoroethylene), those containing nitrogen, and compound complexes of them in which fine grain Ti—O—X based Ti—O—X is mixed and in silica, alumina, fluororesin or those containing nitrogen, or those containing nitrogen, or compound complexes of them used as internal base materials, on the whole surface of which, or on some portion of the external surface of which, Ti—O—X is formed.

Furthermore, it is possible for Ti—O—X to be prepared by various methods of preparing fine grain, a sol gel method, and a chemical reaction method with the above manufacturing process as a base.

Embodiment 2

FIG. 5(a) and FIG. 5(b) show energy E (eV) dependency of the imaginary part of dielectric constant function (e2xy, e2z) obtained by calculation. Here, FIG. 5(a) shows energy dependency in the xy direction (vertical direction to C axis) for titanium oxide crystals, while FIG. 5(b) shows dependency in the z direction (C axis direction).

This imaginary part of dielectric constant function corresponds to the wavelength dependency of optical absorption characteristics. In both Ti—O—N and Ti—O—S, absorption ends are shifted to the lower energy side, that is, the side of wavelengths longer than those of titanium oxide. This result indicates that visible light operation is possible by performing substitution of one of or both of N and S in titanium oxide. Moreover, it was found from the difference between FIG. 5(a) and FIG. 5(b) that optical anisotropy is strong in both titanium oxide and Ti—O—X (X=N or S), and it was found from this result that dependency of photocatalytic activity on a crystal face is strong.

Thus, the absorption end especially in the xy direction is noticeably shifted to the visible light region. It can be seen from this that the photocatalytic article Ti—O—X of the present invention is suitable when the surface structure is mainly oriented in the direction along a C axis. Because light vertically incident to the surface has components of an electric field in propagation and vertical direction (the direction vertical to the surface), visible light can be efficiently absorbed because of light absorption characteristics in the xy direction in FIG. 5(a) if the surface is oriented along the direction of the C axis.

Embodiment 3

FIGS. 6(a) and (b) show the constitution of an Embodiment 3. In FIG. 6(a), Ti—O—X film 12 is formed on the $SiO_2$ substrate 10, and $TiO_2$ film 14 is formed thereon. Moreover, although in the figure, laminated structure of two layers is shown, the boundaries of both become indistinct in the course of heat treatment or the like, resulting in a constitution wherein S gradually decreases toward the surface. That is, $TiO_2$/Ti—O—X film of gradient composition is formed in which the density of S atom is less nearer to the surface, and in which $TiO_2$ is exposed at the outmost surface, though it is also possible to maintain a distinct boundary between the Ti—O—X and $TiO_2$ films.

Such a $TiO_2$/Ti—O—X film can be prepared, for example, as follows. First, as a target, Ti, $TiO_2$, or $TiS_2$ (titanium sulfide) is used and sputtering is conducted in $SO_2+O_2+$inert gas (for example, Ar) to form the Ti—O—X film. Subsequently, $TiO_2$ film is prepared by deposition and heat treatment (for example, 550° C., two hours). Moreover, it is also possible to form $TiO_2$/Ti—O—X film of gradient composition by another manufacturing process. Furthermore, $TiO_2$/Ti—O—X film may be in granular form.

Moreover, gradient composition can be produced not only by heat treatment after lamination layer formation of Ti—O—X and $TiO_2$ films, but also by changing the gas composition in an atmosphere according to the deposition state of the film. That is, it is possible to form $TiO_2$ on the surface side by gradually decreasing the $N_2$ partial pressure of the atmosphere during deposition.

Ti—O—X is a semiconductor which absorbs visible light to produce electrons and holes and exhibits a photocatalytic activity through use of visible light as an operating light. Accordingly, the photocatalyst of this embodiment of gradient composition $TiO_2$/Ti—O—X exhibits a photocatalytic activity similar to that of the $TiO_2$ film while using visible light as the operating light.

That is, visible light is absorbed in the Ti—O—X region (Ti—O—X film 12) near the substrate 10 to produce electrons and holes which are supplied to $TiO_2$ (the $TiO_2$ film 14). In this manner, photocatalytic activity is exhibited at the surface of the $TiO_2$ film 14.

Hence, in the $TiO_2$ film, similar to the conventional example, photocatalytic activity is produced using visible light as operating light. Because comparison of hydrophilic property (contact angle θ) of Ti—O—X and $TiO_2$ films shows that the $TiO_2$ film is superior, improvement in hydrophilic property by the $TiO_2$ film may be sought under visible light. That is, with the configuration of this embodiment, it is possible for hydrophilic property to be exhibited under irradiating irradiation of only visible light and to improve the long-term hydrophilicity compared to that of the $TiO_2$ film.

Furthermore, it is suitable that the $TiO_2$/Ti—O—X photocatalyst of gradient composition, as shown in FIG. 6(b), be in the form of a grain having Ti—O—X part 22 on the inside and $TiO_2$ part 24 on the outside. It is suitable that such a photocatalyst in the form of a grain be mixed in a binder for paints and utilized like paint.

Moreover, the photocatalytic materials of the present invention may be utilized not only in the form of a thin film, but also in various forms such as particles and particle-based binder materials. These various forms of Ti—O—X can be prepared by methods such as various method of preparing thin films, various method of preparing particles, sol gel methods, chemical reaction methods, treatment in plasma containing anion species X, and ion implantation of anions X, in addition to the sputtering method described in the example embodiments.

As explained above, according to the present invention, through a method comprising by at least one of substituting anions X for some of the oxygen sites of titanium oxide crystal, doping anions X in an interstitial site of a titanium oxide crystal, doping anions X in grain boundaries of titanium oxide, or by a combination of these methods, anions X are introduced and trapped in titanium oxide crystals and, as a result, a new level is formed in the band gap of titanium oxide. Thus, a photocatalyst may be obtained which exhibits a photocatalytic activity under visible light, and satisfactory photocatalytic activity can be obtained even under solar or fluorescent light.

INDUSTRIAL APPLICABILITY

Defogging and proofing against the effects of organic substance decomposition can be obtained by forming the present invention on various surfaces.

What is claimed is:

1. A photocatalytic material exhibiting a photocatalytic action when exposed to light with a wavelength in the region of ultraviolet light and visible light, comprising a titanium compound Ti—O—X obtained by at least one of:

substituting an anion X for a plurality of oxygen sites of titanium oxide crystals, doping an anion X between lattices of a titanium oxide crystal, and doping an anion X in grain boundaries of titanium oxide aggregate.

2. The photocatalytic material according to claim 1, wherein said anion X is at least one element selected from the group consisting of B, P, S, Cl, As, Se, Br, Sb, Te, and I, or a molecule containing at least one of these elements.

3. The photocatalytic material according to claim 1, wherein a chemical bond is present between titanium Ti and an anion X.

4. A photocatalytic article comprising the photocatalytic material according to claim 1 and a titanium oxide crystal containing no anions X, formed on the external surface of the photocatalytic material.

5. A photocatalytic article comprising the photocatalytic material according to claim 1, wherein the photocatalytic material is oriented, on its surface, along the C axis direction of the crystal.

6. The photocatalytic material according to claim 2, wherein a chemical bond is present between titanium Ti and an anion X.

7. A photocatalytic article comprising the photocatalytic material according to claim 2 and a titanium oxide crystal containing no anions X, formed on the external surface of the photocatalytic material.

8. A photocatalytic article comprising the photocatalytic material according to claim 3 and a titanium oxide crystal containing no anions X, formed on the external surface of the photocatalytic material.

9. A photocatalytic article comprising the photocatalytic material according to claim 6 and a titanium oxide crystal containing no anions X, formed on the external surface of the photocatalytic material.

10. A photocatalytic article comprising the photocatalytic material according to claim 2, wherein the photocatalytic material is oriented, on its surface, along the C axis direction of the crystal.

11. A photocatalytic article comprising the photocatalytic material according to claim 3, wherein the photocatalytic material is oriented, on its surface, along the C axis direction of the crystal.

12. A photocatalytic article according to claim 4, wherein the photocatalytic material is oriented, on its surface, along the C axis direction of the crystal.

13. A photocatalytic article comprising the photocatalytic material according to claim 6, wherein the photocatalytic material is oriented, on its surface, along the C axis direction of the crystal.

14. A photocatalytic article according to claim 7, wherein the photocatalytic material is oriented, on its surface, along the C axis direction of the crystal.

15. A photocatalytic article according to claim 8, wherein the photocatalytic material is oriented, on its surface, along the C axis direction of the crystal.

16. A photocatalytic article according to claim 9, wherein the photocatalytic material is oriented, on its surface, along the C axis direction of the crystal.

17. A photocatalytic article comprising the photocatalytic material according to claim 1, formed on a substrate.

18. The photocatalytic article according to claim 4, wherein the boundary between the photocatalytic material and the titanium oxide crystal is indistinct, whereby the concentration of anion X gradually decreases toward the surface.

19. The photocatalytic material according to claim 1, which is in the form of a particle.

* * * * *